(12) United States Patent
Nakatsu

(10) Patent No.: US 6,870,908 B2
(45) Date of Patent: Mar. 22, 2005

(54) VOICE STORAGE DEVICE AND INCOMING CALL ANSWERING SYSTEM

(75) Inventor: Makoto Nakatsu, Fukuoka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 76 days.

(21) Appl. No.: 10/454,935

(22) Filed: Jun. 5, 2003

(65) Prior Publication Data

US 2003/0228001 A1 Dec. 11, 2003

(30) Foreign Application Priority Data

Jun. 5, 2002 (JP) ........................................ 2002-163920

(51) Int. Cl.⁷ .......................... H04M 3/533; H04M 1/57
(52) U.S. Cl. .............................. 379/88.15; 379/217.01; 379/274; 379/198
(58) Field of Search ................................ 379/70, 88.16, 379/88.22–88.27, 156, 157, 164, 201.01, 201.06–201.08, 211.01–211.03, 212.01, 213.01, 214.01, 217.01, 188, 196, 198, 242, 251, 252, 258, 268, 270, 271, 272, 274, 275, 276, 327, 373.01, 373.02, 374.02

(56) References Cited

U.S. PATENT DOCUMENTS

| | | |
|---|---|---|
| 5,249,219 A | 9/1993 | Morganstein et al. |
| 5,479,491 A | 12/1995 | Herrero Garcia et al. |
| 5,933,488 A * | 8/1999 | Marcus et al. .......... 379/217.01 |
| 6,542,584 B1 * | 4/2003 | Sherwood et al. ....... 379/88.18 |
| 6,745,221 B1 * | 6/2004 | Ronca ........................ 718/104 |
| 2003/0228001 A1 * | 12/2003 | Nakatsu ..................... 379/67.1 |

FOREIGN PATENT DOCUMENTS

| | | |
|---|---|---|
| EP | 0 420 527 A | 4/1991 |
| EP | 1 071 266 A | 1/2001 |
| JP | 9-289550 | 11/1997 |
| JP | 10-13873 | 1/1998 |
| JP | 11-187113 | 7/1999 |
| JP | 2001-186261 | 7/2001 |

* cited by examiner

Primary Examiner—Roland G. Foster
(74) Attorney, Agent, or Firm—RatnerPrestia

(57) ABSTRACT

According to the present invention, a voice storage device includes a port control unit for monitoring a service state of a port of a PBX extension circuit, and a private branch exchange is configured to transmit, upon receipt of an incoming call, an incoming signal including caller information and the number of a port receiving the incoming call to the voice storage device without bringing an outside line to an off-hook state. As the voice storage device receives the incoming signal, the port control unit detects the port, which is available. When the port is available, paging directed to an individual extension telephone is performed through the private branch exchange by use of this available port, and until the outside line goes off-hook, a caller keeps hearing a ringback tone with the ringing signal being sent from a telephone office to the caller.

9 Claims, 7 Drawing Sheets

FIG. 2

| Row | Telephone number | Name | Affiliation | position |
|---|---|---|---|---|
| 1 | 5432-0001 | Yoshiko Suzuki | ○○ Corporation | |
| 2 | 1234-5678 | Jiro Tanaka | AA Association | Chief |
| 3 | 011-111-1111 | Ichiro Nippon | Sales department of BB Co., Ltd. | Manager |
| ⋮ | ⋮ | ⋮ | ⋮ | ⋮ |
| ⋮ | ⋮ | ⋮ | ⋮ | ⋮ |
| | | | | |
| | | | | |

VOICE STORAGE DEVICE AND INCOMING CALL ANSWERING SYSTEM

TECHNICAL FIELD

The present invention relates to a voice storage device and an incoming call answering system including a private branch exchange and the voice storage device.

BACKGROUND ART

A conventional incoming call answering system constructed of a private branch exchange and a voice storage device determines whether to answer or not, depending on caller information. As disclosed, for example, in Japanese Patent Unexamined Publication No. H10-13873, when a signal indicative of an incoming call from a public network is input to the private branch exchange or the voice storage device, a calling number detector detects a calling number, and the voice storage device searches through the contents of a personal answering control memory based on an extension number and the calling number that are detected. If the calling number is a number that is allowed to be answered, a controller of the voice storage device issues a command for calling a designated extension telephone, whereby control is performed to establish a link between the public network and the designated telephone. If the calling number is a number that is disallowed to be answered, a message from a caller is recorded in a box of a voice storage memory that corresponds to the caller.

Another incoming call answering system performs such answering processing as to route the incoming call by utilizing paging. In this incoming call answering system, the private branch exchange allows the voice storage device to receive the call just as it is when the call arrives from an outside line such as a public line, and the voice storage device goes off-hook to connect to the line. Next, the voice storage device retrieves a stereotyped message, such as "Please hold on for a moment", stored in its audio guidance storage unit, transmits this message to the caller and places the line on hold for a while to call a called party by paging.

Since the caller can be identified by use of, for example, an ISDN call setup message or the caller information (calling number) transmitted over an analogue line by a number display service, a message including the name of the caller, such as "There is a call from XX", is synthesized, forwarded to the extension telephones and announced from all the extension telephones at once with an outside line button of each of the extension telephones being blinked. When the called party or a party concerned presses the blinking outside line button, the line is connected for conversation. In cases where no one presses the blinking outside line button even after a lapse of a specified time, the voice storage device retrieves a stereotyped message such as "We cannot answer the phone now, so we will record your message" from the audio guidance storage unit, returns the line, which has been put on hold, to a talk mode, answers by transmitting this stereotyped message and shifts to a message recording mode.

Japanese Patent Unexamined Publication No. H09-289550 discloses paging performed by a private automatic branch exchange connected to an external output device. Japanese Patent Unexamined Publication No. H11-187113 discloses a technique for converting the caller information (calling number) to voice.

However, answering processing performed by the conventional private branch exchange and voice storage device has the following problem. When the signal indicative of the incoming call from the public network is input to the private branch exchange or the voice storage device, the line is first connected to send an automatic guidance message to the caller. In cases where the caller is requested to hold on, the line is placed on hold, and no sound or BGM or the like is played. This causes the caller to worry whether calling is really being made or to become impatient for the line to go off-hook because the caller will be charged for the call.

In many cases, even those who hear the general calling wonder if the calling is really for them or hesitate about whether to answer the phone because the content of the synthesized message is superficial. If a wrong person answers the phone, call redirection is repeated again, so that it is useless to make the calling by paging.

DISCLOSURE OF THE INVENTION

A voice storage device includes:

a PBX extension circuit, connected to a private branch exchange, for transmitting and receiving a voice signal;

a message storage unit capable of storing a message from a caller;

an audio guidance storage unit stored with a guidance message;

a port control unit for monitoring a service state of a port of the PBX extension circuit; and a controller, wherein the controller causes the port control unit to detect the port which is available between the private branch exchange and the PBX extension circuit upon receipt of a signal sent from the private branch exchange, paging directed to an extension telephone is performed through the private branch exchange when the port is available, and automatic answering processing is performed for an incoming call when the port is not available.

BRIEF DESCRIPTION OF THE DRAWINGS

FIG. 2 is a conceptual illustration of a caller information table provided in a memory of a voice storage device in accordance with the first embodiment.

DETAILED DESCRIPTION OF THE PREFERRED EMBODIMENTS

First Exemplary Embodiment

Figure 1:
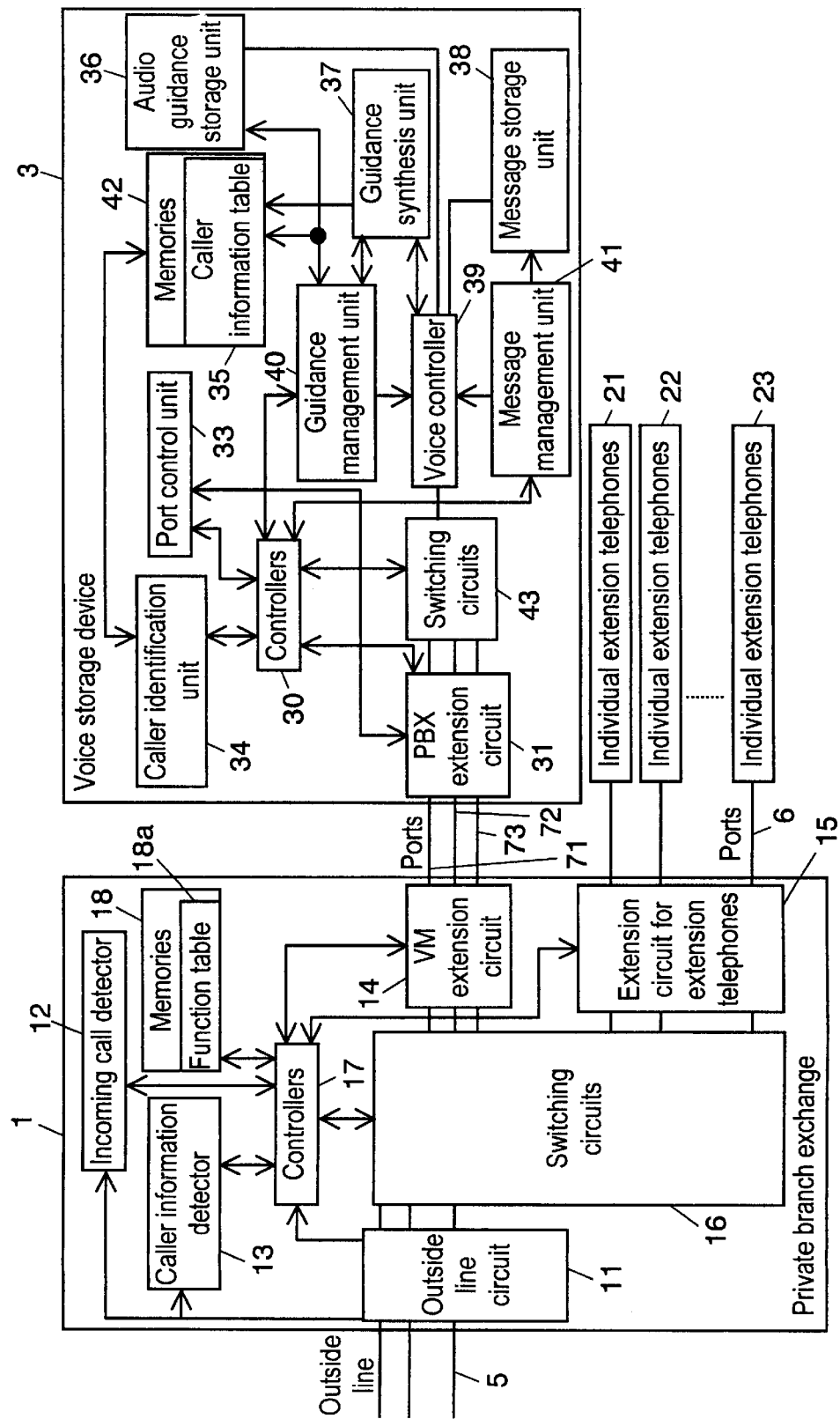
FIG. 1 illustrates an incoming call answering system in accordance with a first exemplary embodiment of the present invention.

Referring to the accompanying drawings, a description will be provided hereinafter of a private branch exchange, a voice storage device and an incoming call answering system including the private branch exchange and the voice storage device in accordance with a first exemplary embodiment. FIG. 1 illustrates the incoming call answering system of the present embodiment. In FIG. 1, the incoming call answering system is constructed of individual extension telephones 21, 22, 23, private branch exchange 1 and voice storage device 3, connected to private branch exchange 1, for offering given voice mail service in response to an incoming call. Outside line 5 is, for example, a public line.

Private branch exchange 1 includes a plurality of ports 6 connecting respective individual extension telephones 21, 22, 23 to private branch exchange 1 and ports 71, 72, 73 connecting private branch exchange 1 to voice storage device 3.

In cases where private branch exchange 1 is a digital private branch exchange, control data is transmitted over a control channel (D channel) provided separately from a data channel (B channel) which transmits a voice signal. The present embodiment refers to three ports 71, 72, 73. However, the number of ports is not limited to three, provided that there is a plurality of ports. Ports 6 and ports 71, 72, 73 can be shared.

Next, private branch exchange 1 will be described in detail. Outside line circuit 11 is connected to outside line 5 and performs processing on an incoming call and transmits and receives the voice signal. Incoming call detector 12 is connected to outside line circuit 11 and detects the incoming call from outside line 5. This incoming call detector 12 and outside line circuit 11 form an outside trunk. Caller information detector 13 is connected to outside line circuit 11 and detects caller information sent over outside line 5. In cases where, for example, a telephone company offers such caller information service as to transmit a calling number, caller information detector 13 retrieves a call setup message transmitted over a telephone line or the calling number carried by a modem signal sent over an analogue line.

VM extension circuit 14 transmits and receives the voice signal to and from voice storage device 3. Extension circuit 15 for the extension telephones transmits and receives the voice signal to and from each of individual extension telephones 21, 22, 23. Switching circuit 16 is connected to outside line circuit 11, VM extension circuit 14 and extension circuit 15 for the extension telephones and opens and closes a channel. In cases where ports 6 and ports 71, 72, 73 are shared, VM extension circuit 14 and extension circuit 15 for the extension telephones are integrated into one as a common extension circuit. Controller 17 controls extension circuits 14, 15, outside line circuit 11 and switching circuit 16. Private branch exchange 1 also includes memory 18 and function table 18a located in memory 18.

Controller 17 is a means for implementing each function by loading a control program into a central processing unit (CPU), and the control program is stored in memory 18. Function table 18a in memory 18 is stored with a service request command for causing private branch exchange 1 to start an exchange function. For example, a service request command (paging-specific number) for paging service is set as "#41", and upon receipt of this "#41" from voice storage device 3, private branch exchange 1 is activated for paging service and performs paging directed to individual extension telephones 21, 22, 23.

In private branch exchange 1 thus configured, incoming call detector 12 detects an incoming signal which has arrived at outside line circuit 11 from outside line 5 such as the public line. Simultaneously, the incoming signal is input to caller information detector 13, which in turn detects the caller information. Next, private branch exchange 1 blinks an outside line button of each of individual extension telephones 21, 22, 23 to indicate the incoming call and then transmits an incoming signal including the caller information and the number of an outside port receiving the incoming call to voice storage device 3 by using, for example, port 71.

During the above process, private branch exchange 1 does not bring outside line 5 receiving the incoming call to an off-hook state, so that the caller keeps hearing a ringback tone (ringing signal) sent from a telephone office. Controller 17 does not bring outside line circuit 11 receiving the incoming call to the off-hook state until the following given process ends. The caller thus keeps hearing only the ringback tone until the receiving side goes off-hook.

When the incoming signal is transmitted to voice storage device 3, voice storage device 3 checks for an available port (will be detailed later). If, for example, port 72 is available, voice storage device 3 activates intercom paging and sends the paging-specific number, "#41", and a call message prepared for paging to private branch exchange 1 from port 72. Controller 17 of private branch exchange 1 sends this call message to individual extension telephones 21, 22, 23 from all ports 6 of extension circuit 15. The call message is thus announced from respective loudspeakers of extension telephones 21, 22, 23. Here, an LED of each outside line button is already being blinked to indicate the incoming call.

When someone who has heard the announcement lifts a telephone receiver and presses the blinking outside line button of the individual extension telephone, controller 17 of private branch exchange 1 controls outside line circuit 11 to seize the outside line. In other words, outside line 5 receiving the incoming call is brought to the off-hook state, and the channel is established between the individual extension telephone having the outside line button pressed and outside line 5 for conversation.

Next, voice storage device 3 will be described in detail. As shown in FIG. 1, voice storage device 3 includes controller 30 for controlling the whole voice storage device, PBX extension circuit 31, connected to private branch exchange 1, for transmitting and receiving the voice signal, and port control unit 33, connected to PBX extension circuit 31, for monitoring a service state of each port connected to private branch exchange 1. Port control unit 33 monitors the state of PBX extension circuit 31. In cases where above-described ports 6 and ports 71, 72, 73 are shared, port control unit 33 monitors the service state of every port of the extension circuit.

Upon receipt of the incoming signal, controller 30 inquires of port control unit 33 whether port 71, 72 or 73 subject to monitoring is available. Port control unit 33 informs controller 30 of the available port(s). When no port is available, port control unit 33 informs controller 30 that no port is available. Controller 30 selects, for example, port 72 from unassigned ports 72, 73.

Port control unit 33 may monitor the state of each port by referring to a port state flag stored in a working memory area located in memory 42 or by any other methods capable of determining the state of each port.

Voice storage device 3 also includes caller identification unit 34 for identifying the caller from the caller information sent from private branch exchange 1, caller information table 35 previously stored with caller information, and audio guidance storage unit 36 stored with stereotyped words and phrases used in automatic answering. The stereotyped words and phrases stored in audio guidance storage unit 36 fall into two groups. The stereotyped phrase used as it is in automatic answering, such as "Please hold on for a moment", falls into one of the groups, while the stereotyped phrase used for synthesis of the call message, such as "There is a call from XX", falls into the other group. Guidance synthesis unit 37 is connected to caller information table 35, voice controller 39 (will be described later) and guidance management unit 40 (will be described later) and synthesizes the call message or other guidance messages by using the stereotyped word and phrase stored for synthesis and the caller information. Message storage unit 38 stores the voice signal from outside line 5.

Voice controller 39 is connected to guidance synthesis unit 37 and performs input/output processing such as converting the call message synthesized in data form to the voice signal or converting the voice signal from the outside line into a form which can be stored in the message storage unit. Guidance management unit 40 manages caller information table 35 and audio guidance storage unit 36. Message management unit 41 manages message storage unit 38 and voice controller 39. Memory 42 stores caller information table 35 and other data, such as the number of the outside port, that is transmitted from private branch exchange 1. Switching circuit 43 opens and closes a channel between PBX extension circuit 31 and voice controller 39.

Memory 42, audio guidance storage unit 36 and message storage unit 38 can be provided in one disk unit, which excludes RAM and serves as a work area of the central processing unit (CPU). It is preferable, however, that audio guidance storage unit 36 and message storage unit 38 are provided as discrete external storage units as shown in FIG. 1. Controller 30 is a means for implementing each function by loading a control program into the central processing unit, and the control program is stored in memory 42. Controller 30 passes the caller information obtained to caller identification unit 34, which in turn identifies the caller by using caller information table 35.

A description will be provided hereinafter of a process for identifying the caller in accordance with the present embodiment. FIG. 2 is a conceptual illustration of the caller information table provided in the memory of the voice storage device of this embodiment. When private branch exchange 1 informs of the caller information obtained from the call setup message or the like, caller identification unit 34 retrieves, in many cases, the telephone number from the caller information and compares this telephone number with the telephone number stored in caller information table 35. If these telephone numbers coincide with each other as a result of retrieval, information in a row including the coincided telephone number is identified as information about the caller. Caller information table 35 is stored with several pieces of information including the name, affiliation, address and position of a telephone user. A series of these pieces of information is utilizable as the information about the caller. The name and affiliation of the telephone user, in particular, are interpreted as the information for identifying the caller and used by guidance synthesis unit 37.

In cases where the caller cannot be identified, caller identification unit 34 informs controller 30 that the caller cannot be identified. Controller 30 informed requests private branch exchange 1 to seize the line, and voice storage device 3 transmits the automatic guidance message stored in audio guidance storage unit 36 and records the message from the caller as usual.

In cases where the caller can be identified, caller identification unit 34 informs controller 30 that the caller could be identified. Controller 30 provides this information to guidance management unit 40, which in turn instructs guidance synthesis unit 37 to synthesize the call message. Based on the number of the outside port receiving the incoming call that is stored in memory 42 and the pieces of information in caller information table 35 that include the name and affiliation, guidance synthesis unit 37 retrieves the stereotyped words and phrases for synthesis, such as "There is a call from", "at", "on" and "outside line X", from audio guidance storage unit 36 and combines these words and phrases to synthesize a call message, "There is a call from XX at XX Co. Ltd. on outside line X".

Referring to FIG. 2, a description will be provided hereinafter of a concrete example of the thus-synthesized message specific to the identified caller. As shown in FIG. 2, if the telephone number is "1234-5678", the caller can be identified as known "Jiro Tanaka", and if private branch exchange 1 informs that the number of the outside port is three, guidance synthesis unit 37 retrieves the data including "There is a call from" "of" "on" "outside line" "three" from audio guidance storage unit 36. Simultaneously, guidance synthesis unit 37 retrieves the data including "Jiro Tanaka", "AA Association" and "the chief" from the data in "row 2". Guidance synthesis unit 37 then combines these data to synthesize a call message, "There is a call from Jiro Tanaka, the chief of AA Association, on outside line three". It is to be noted that guidance synthesis unit 37 synthesizes the call message after these data undergo voice controller 39, which performs data compression and decompression. The voice message thus synthesized is converted to the voice signal by voice controller 39, passed to switching circuit 43 and transmitted. The message prepared in such a manner is transmitted from individual extension telephones 21, 22, 23 for paging.

Figure 3:
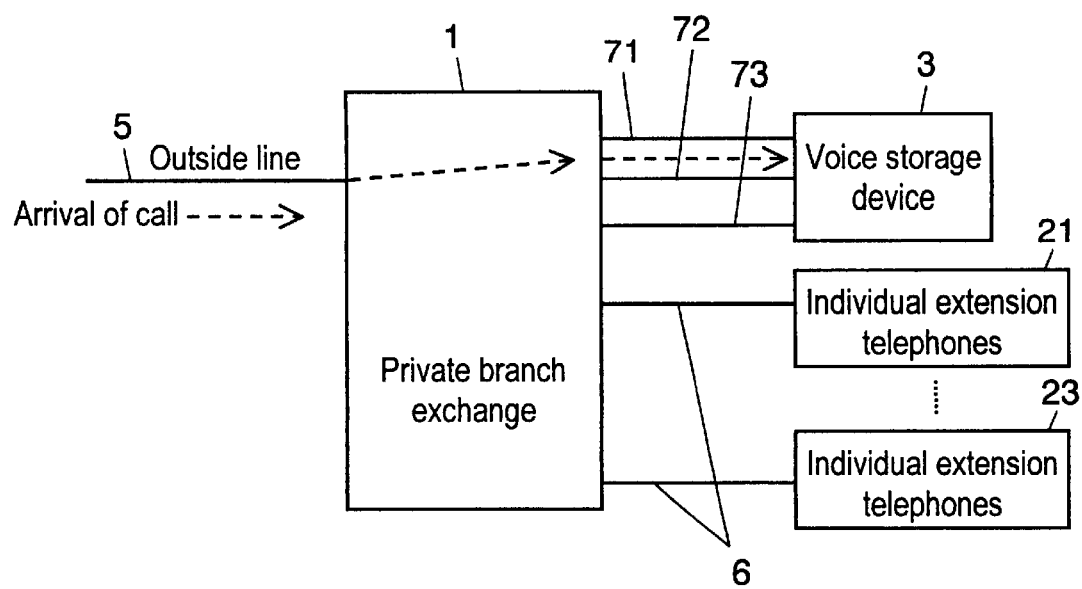
FIG. 3 shows an incoming call received via a private branch exchange of the incoming call answering system in accordance with the first embodiment.
Figure 4:
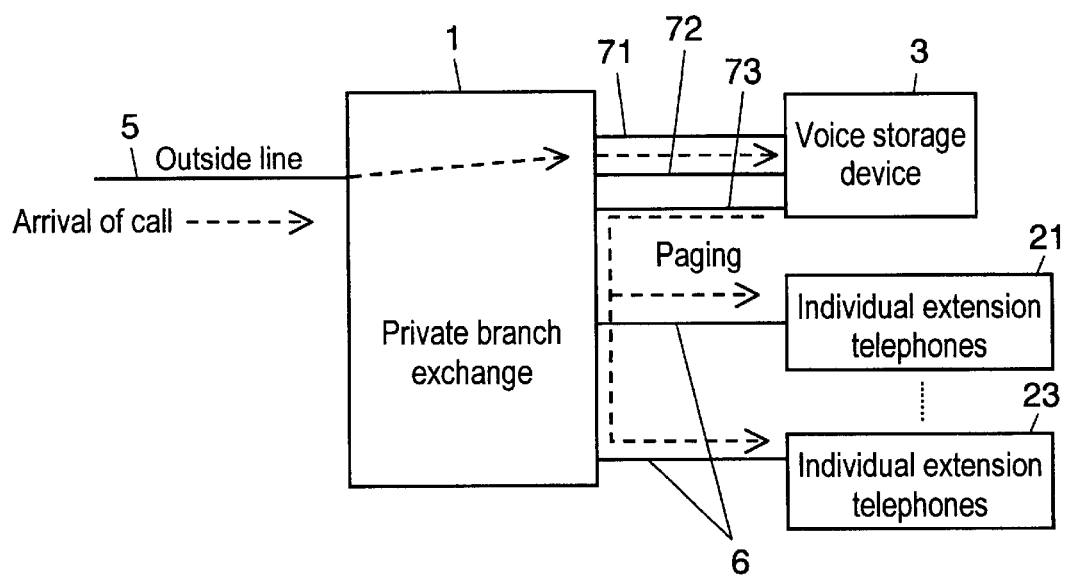
FIG. 4 shows the voice storage device performing paging directed to individual extension telephones of the incoming call answering system in accordance with the first embodiment.
Figure 5:
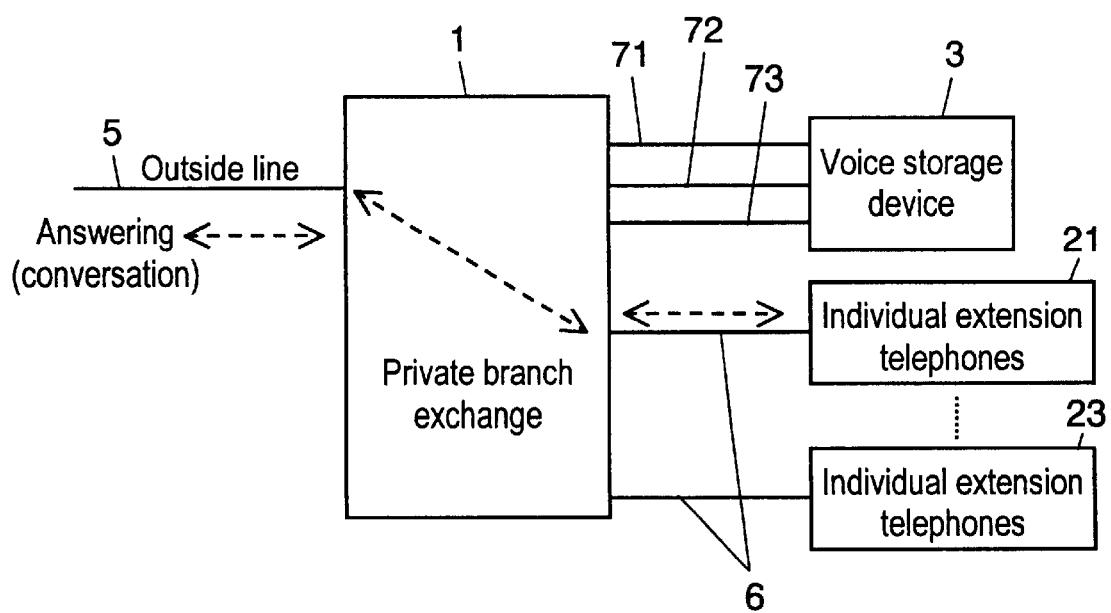
FIG. 5 shows a channel established in the incoming call answering system in accordance with the first embodiment.

Referring to FIGS. 3–5, a description will be provided next of a basic operation of the incoming call answering system of the present embodiment. As shown in FIG. 3, when the call arrives from outside line 5, incoming call detector 12 of private branch exchange 1 detects the incoming call, and caller information detector 13 detects the caller information. Next, controller 17 of private branch exchange 1 blinks the outside line button of each of individual extension telephones 21, 22, 23 to indicate the incoming call and then transmits the incoming signal including the caller information and the number of the port receiving the incoming call to voice storage device 3. During the above process, the ringing signal is transmitted to the caller from the telephone office, so that the caller keeps hearing the ringback tone until outside line 5 goes off-hook. Private branch exchange 1 does not transmit an answering signal until the following given process ends.

Upon receipt of the incoming signal, voice storage device 3 checks for the available port by means of port control unit 33. If the port is available, a determination is made as to whether the caller can be identified. If the caller cannot be identified, general calling including the caller information cannot be made, so that a process of recording the message or the like is carried out as usual. It is to be noted that a message may be generated to include only information, which can be identified, for paging.

If the caller can be identified, voice storage device 3 produces the call message specific to the identified caller by using the caller information and requests for paging by sending the paging-specific number, "#41", to private branch exchange 1 from the available port, as shown in FIG. 4. As private branch exchange 1 receives the call message, controller 17 recognizes the service request command as the paging-specific number by referring to function table 18a and then sends the call message to individual extension telephones 21, 22, 23 from all ports 6 of extension circuit 15, whereby the call message is announced from the respective loudspeakers of extension telephones 21, 22, 23. Here, the LED of each outside line button is being blinked to indicate the incoming call.

When a called party presses the outside line button (not shown) of individual extension telephone 21, 22 or 23 in the state illustrated by FIG. 4, private branch exchange 1 transmits the answering signal responsive to the incoming call, thus establishing the channel as shown in FIG. 5. Here, the ringback tone stops, whereby the caller is allowed to have the conversation. Although the drawings do not illustrate, in cases where a specified time elapses since the calling because of the absence of the called party from individual extension telephones 21, 22, 23, voice storage device 3 answers, and private branch exchange 1 transmits the answering signal, thus seizing the line. Thereafter, voice storage device 3 transmits the automatic guidance message stored in audio guidance storage unit 36 and records the message from the caller as usual.

Figure 6:
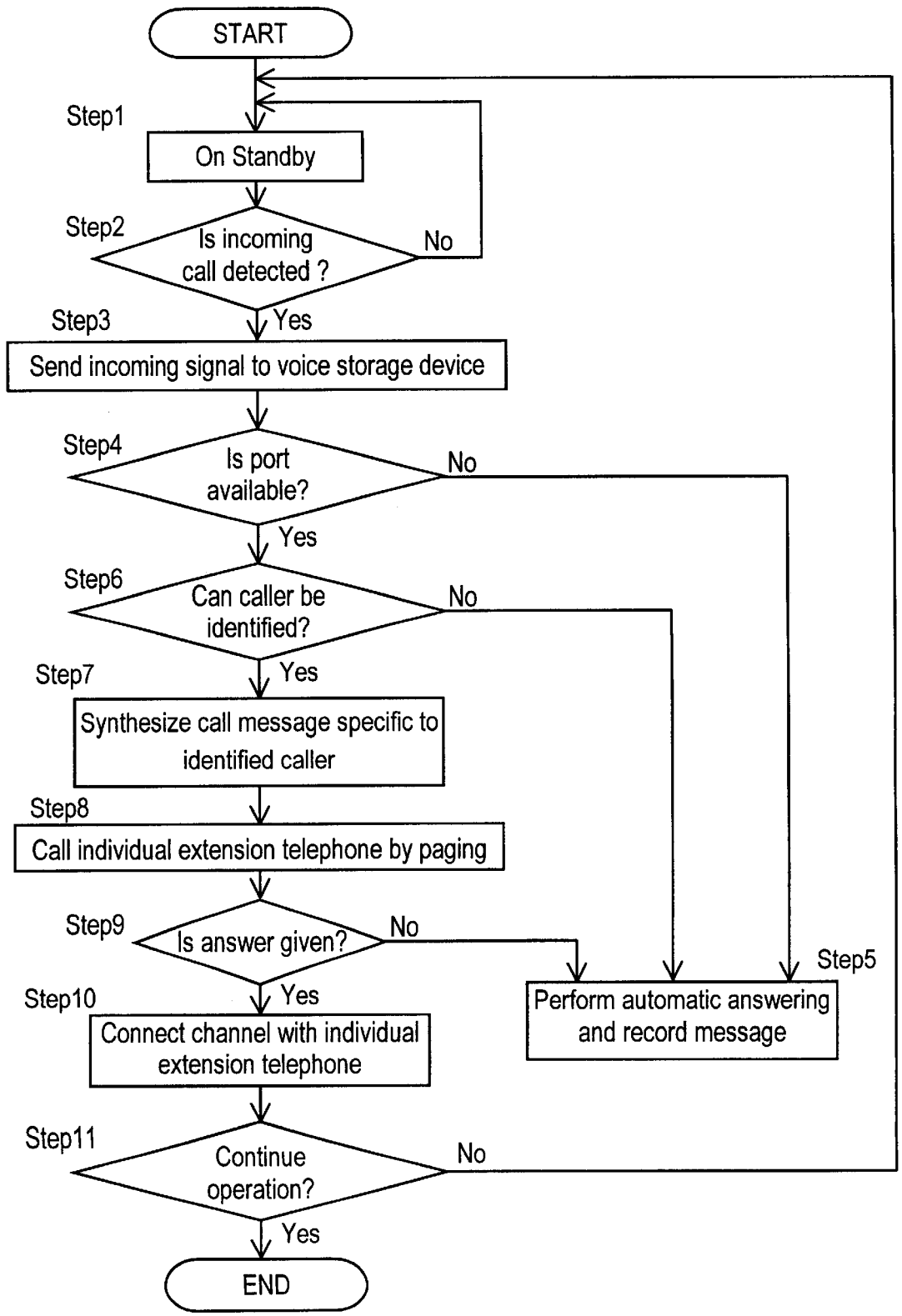
FIG. 6 is a flowchart of operation of the incoming call answering system in accordance with the first embodiment.

A description will be provided next of a concrete example of the flow of operation of the incoming call answering system in accordance with the present embodiment. FIG. 6 is a flowchart of the operation of the incoming call answering system of the present invention. When "Ichiro Nippon" at "sales department of BB Co., Ltd." has made a call originating from a telephone number, "011-111-1111", for a called party, "Saburo Fukuoka", who uses individual extension telephone 21, private branch exchange 1 is in a standby state, and the call arrives, for example, at "outside line three" (step 1). As the incoming call arrives at "outside line three", private branch exchange 1 detects this call and also detects the telephone number, "011-111-1111" (step 2). Private branch exchange 1 thereafter transmits the incoming signal including data on the detected telephone number, "011-111-1111", and information indicative of "outside line three" to voice storage device 3 (step 3).

Upon receipt of this incoming signal, voice storage device 3 checks for an available port other than the port, which has received the incoming signal (step 4).

If the port is available, voice storage device 3 determines whether the caller can be identified from the telephone number, "011-111-1111" (step 6). If the caller cannot be identified, voice storage device 3 answers and records the message (step 5).

If the caller can be identified (in step 6), a call message such as "There is a call from Jiro Nippon, the manager of sales department of BB Co., Ltd. on outside line three" is synthesized by use of the caller information stored in caller information table 35, such as "Jiro Nippon" and "sales department of BB Co., Ltd.", the stereotyped words and phrases and the information such as "outside line three" (step 7). The call message synthesized is sent to private branch exchange 1 for paging directed to individual extension telephones 21, 22, 23 (step 8) and announced from extension telephones 21, 22, 23, the respective outside line buttons of which each have the LED blinking.

In this state, an answer from individual extension telephone 21, 22 or 23 is awaited (step 9).

When "Saburo Fukuoka" who is the user of the individual extension telephone hears the announcement from extension telephone 21 in step 9 and answers by pressing the button corresponding to "outside line three", information about the pressed outside line button is transmitted to private branch exchange 1. Here, private branch exchange 1 brings the outside line receiving the incoming call to the off-hook state for the first time and transmits the answering signal to the caller, whereby the channel is established between individual extension telephone 21 and the caller named "Jiro Nippon" (step 10).

If the specified time elapses with no answer made in step 9, voice storage device 3 answers, and private branch exchange 1 transmits the answering signal, thus seizing the line. Voice storage device 3 then records the message (step 5). After step 10, a determination is made as to whether the operation of the incoming call answering system is to be continued (step 11). To continue, the process returns to step 1 where the incoming call answering system is brought to the standby state. To discontinue the operation, the process ends.

As described above, the private branch exchange, the voice storage device and the incoming call answering system including the private branch exchange and the voice storage device can determine whether the calling can be made by paging by checking for the available port. Since the port control unit monitors the ports, the available port can be found immediately. In cases where the port is available, the caller hears the ringback tone until the individual extension telephone goes off-hook. This does not cause conventional worry or impatience after the line goes off-hook, and the line can be connected promptly at a low charge. In cases where no port is available, normal automatic answering processing can be carried out.

In the above description, when the caller cannot be identified with the port even available, voice storage device 3 answers and records the message. However, even when the caller cannot be identified, paging may be carried out if the name of the caller is received from the telephone line via the private branch exchange. In other words, in cases where the name of the caller is transmitted with the port available even when the caller cannot be identified, guidance management unit 40 can instruct guidance synthesis unit 37 to synthesize the call message, and guidance synthesis unit 37 can retrieve the stereotyped words and phrases for synthesis, such as "There is a call from", "on" and "outside line X", from audio guidance storage unit 36 based on the number of the outside port receiving the incoming call that is stored in memory 42 and the name of the caller (note: both the number of the outside port and the name of the caller are transmitted from the private branch exchange) and combine these words and phrases to synthesize the call message, "There is call from XX on outside line X".

The target of paging can be varied according to the number of the outside port, which receives the incoming call, or the caller information. In other words, a paging group (e.g., a group of extension telephones 21 and 22) that is related to the received caller information is stored in the memory in connection with the caller information, the paging group corresponding to the received caller information is retrieved from the memory, and paging is performed by use of the number of this paging group. For example, if the number of the paging group is "1", this "1" may be added to follow the paging-specific number "#41". Upon detection of this number (#411), the private branch exchange recognizes this number as a command for paging directed to the paging group "1" and performs paging directed to only extension telephones 21 and 22 in the paging group "1". Similarly, the paging group can be connected with the number of the outside port, which receives the incoming call, for operation.

Second Exemplary Embodiment

Figure 7:
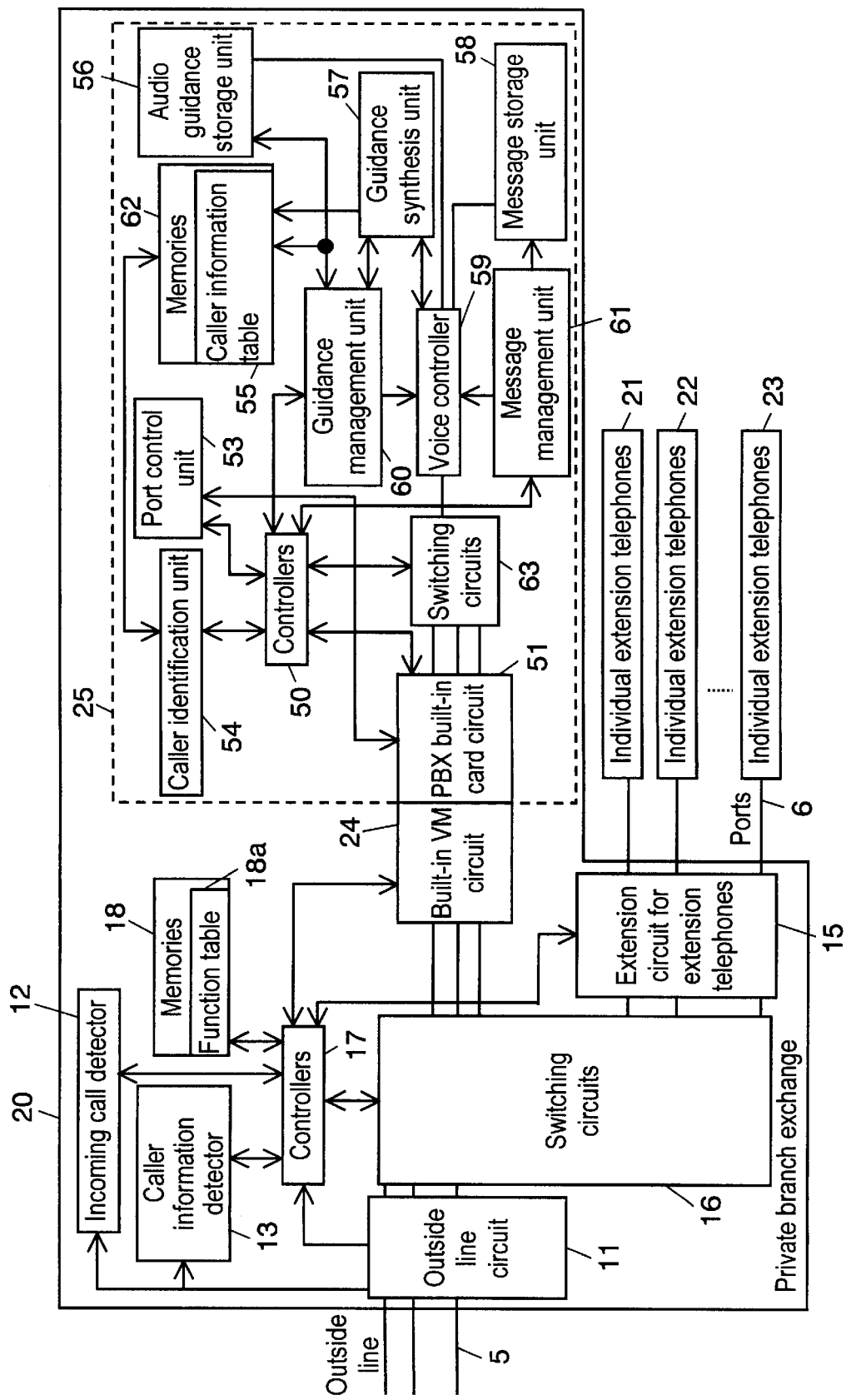
FIG. 7 illustrates an incoming call answering system in accordance with a second exemplary embodiment of this invention.

A description will be provided hereinafter of an incoming call answering system in accordance with a second exemplary embodiment. In FIG. 7, private branch exchange 20 includes built-in VM card 25 for implementing voice mail service. Built-in VM circuit 24 acts as an interface for connecting with built-in VM card 25 functioning as a voice storage device. Other elements of private branch exchange 20 are similar in structure to those in the first exemplary embodiment and will not be described in detail.

A description will now be provided of built-in VM card 25. This built-in VM card 25 includes PBX built-in card circuit 51, connected to built-in VM circuit 24 of private branch exchange 20, for transmitting and receiving a voice signal. Built-in VM card 25 also includes port control unit 53 for monitoring a service state of a port connected to private branch exchange 20.

Built-in VM card 25 further includes caller identification unit 54 for identifying a caller from caller information sent from private branch exchange 20, caller information table 55 previously stored with caller information, and audio guidance storage unit 56 stored with stereotyped words and phrases used in automatic answering. Similarly to that of the first embodiment, audio guidance storage unit 56 is stored with a group of the stereotyped phrases used in automatic answering and a group of the stereotyped words and phrases used for synthesis of a call message. Built-in VM card 25 further includes guidance synthesis unit 57, message storage unit 58, voice controller 59, guidance management unit 60, message management unit 61, memory 62 and switching circuit 63, and these elements each operate in the same manner as in the first embodiment.

Even such VM card 25 included in private branch exchange 20 can determine whether calling can be made by paging by checking for an available port when an incoming call is received, so that when the port is available, the caller keeps hearing a ringback tone until an individual extension telephone goes off-hook.

According to the present invention described above, the port control unit is provided in the voice storage device to monitor the service state of each port of the PBX extension circuit, and upon receipt of the incoming signal from the private branch exchange receiving the incoming call, the port control unit detects the available port. In cases where the port is available, the controller causes paging directed to the individual extension telephones through the private branch exchange by use of the available port. When the incoming call is received from the outside line, a check is made for the available port between the private branch exchange and the voice storage device, whereby a determination can be made as to whether calling is possible by paging with the line not seized. Since the port control unit monitors the ports, the available port can be found immediately, thus allowing prompt response. When the port is available, the caller keeps hearing the ringback tone sent from the telephone office until the individual extension telephone goes off-hook. This does not cause the conventional worry or impatience after the line goes off-hook, and the line can be connected promptly at the low charge. When no port is available, the voice storage device goes off-hook to seize the line and can perform normal answering processing.

The voice storage device includes the voice controller, connected to the message storage unit and the audio guidance storage unit, for performing input/output processing on the message, the message management unit for controlling the voice controller and managing the message, and the guidance management unit for controlling the voice controller and managing the guidance message. Since the guidance management unit selects and transmits one or more guidance messages stored in the audio guidance storage unit, the appropriate message is selected from the guidance messages stored in the audio guidance storage unit in paging directed to the individual extension telephones from the private branch exchange through use of the available port, whereby the user of the individual extension telephone can respond promptly.

The voice storage device also includes the caller identification unit for identifying the caller from the caller information informed by the private branch exchange, and the caller information table stored with the caller information. In cases where the caller identification unit could identify the caller by referring to the caller information table, the guidance management unit allows the private branch exchange to perform paging using the guidance message specific to the caller identified. In cases where the port is available, calling is made immediately by paging using the guidance message specific to the caller identified from the caller information with no answer being made to the incoming call. In cases where the caller is identified, the private branch exchange is caused to perform paging using the guidance message specific to the identified caller, so that the guidance message can give immediate notice of the caller, thus allowing the line to be connected promptly at the low charge without causing any worry or impatience.

The voice storage device is also provided with the guidance synthesis unit for synthesizing the call message specific to the identified caller based on the name of the caller identified by the caller identification unit and the guidance message stored in the audio guidance storage unit. Since the guidance management unit allows the private branch exchange to perform paging using the synthesized call message specific to the caller, the guidance synthesis unit synthesizes the guidance message specific to the identified caller when the port is available, and calling is made by paging with no answer being made to the incoming call. The guidance message can thus give immediate notice of the caller, and the line can be connected promptly.

What is claimed is:

1. A voice storage device comprising:
   (a) a PBX extension circuit, connected to a private branch exchange, for transmitting and receiving a voice signal;
   (b) a message storage unit capable of storing a message from a caller;
   (c) an audio guidance storage unit stored with a guidance message;
   (d) a port control unit for monitoring a service state of a port of the PBX extension circuit; and
   (e) a controller,
   wherein the controller causes the port control unit to detect the port which is available between the private branch exchange and the PBX extension circuit upon receipt of a signal sent from the private branch exchange, paging directed to an extension telephone is performed through the private branch exchange when the port is available, and automatic answering processing is performed for an incoming call when the port is not available.

2. The voice storage device of claim 1, wherein the controller causes the port control unit to detect the port which is available between the private branch exchange and the PBX extension circuit, the paging directed to the extension telephone is performed through the private branch exchange when the caller can be identified with the port available, and the automatic answering processing is performed for the incoming call when the caller cannot be identified with the port available.

3. A voice storage device, comprising:
(a) a PBX extension circuit, connected to a private branch exchange, for transmitting and receiving a voice signal;
(b) a message storage unit capable of storing a message from a caller;
(c) an audio guidance storage unit stored with a guidance message;
(d) a switching circuit, connected to the PBX extension circuit, for establishing a channel between the message storage unit or the audio guidance storage unit and the PBX extension circuit;
(e) a controller for controlling the switching circuit; and
(f) a port control unit for monitoring a service state of a port of the PBX extension circuit,
wherein the port control unit detects the port which is available when an incoming signal is received from the private branch exchange receiving an incoming call, the controller causes paging directed to an extension telephone through the private branch exchange by use of the available port when the port is available, and the controller performs automatic answering processing for the incoming call when the port is not available.

4. The voice storage device of claim 3, further comprising:
(g) a voice controller, connected to the message storage unit and the audio guidance storage unit, for performing input/output processing on the message;
(h) a message management unit for controlling the voice controller and managing the message; and
(i) a guidance management unit for controlling the voice controller and managing the guidance message,
wherein the guidance management unit selects and sends at least one of the guidance messages stored in the audio guidance storage unit in paging.

5. The voice storage device of claim 4, further comprising:
(j) a caller identification unit for identifying the caller from caller information informed from the private branch exchange; and
(k) a caller information table stored with caller information,
wherein when the caller identification unit can identify the caller by referring to the caller information table, the guidance management unit allows the private branch exchange to perform paging using the guidance message specific to the caller identified.

6. The voice storage device of claim 5, further comprising:
(l) a guidance synthesis unit for synthesizing a call message specific to the identified caller from a name of the caller identified by the caller identification unit and the guidance message stored in the audio guidance storage unit,
wherein the guidance management unit allows the private branch exchange to perform paging using the synthesized call message specific to the caller.

7. An incoming call answering system comprising:
(a) a private branch exchange;
(b) an extension telephone connected to the private branch exchange; and
(c) a voice storage device connected to the private branch exchange,
wherein the private branch exchange transmits, upon receipt of an incoming call, an incoming signal including caller information and the number of a port accepting the incoming call to the voice storage device without bringing an outside line to an off-hook state, and
wherein the voice storage device detects, upon receipt of the incoming signal, a port which is available between the private branch exchange and the voice storage device and causes paging directed to the extension telephone through the private branch exchange when the port is available.

8. The incoming call answering system of claim 7, wherein the private branch exchange brings the outside line receiving the incoming call to the off-hook state to establish a channel between the extension telephone and the outside line when an outside line button of the extension telephone is operated in response to the paging.

9. An incoming call answering system comprising:
(a) a private branch exchange;
(b) an extension telephone connected to the private branch exchange; and
(c) a voice storage device comprising:
(c-1) a PBX extension circuit, connected to the private branch exchange, for transmitting and receiving a voice signal;
(c-2) a message storage unit capable of storing a message from a caller;
(c-3) au audio guidance storage unit stored with a guidance message;
(c-4) a switching circuit, connected to the PBX extension circuit, for establishing a channel between the message storage unit or the audio guidance storage unit and the PBX extension circuit;
(c-5) a controller for controlling the switching circuit; and
(c-6) a port control unit for monitoring a service state of a port of the PBX extension circuit,
wherein the private branch exchange transmits an incoming signal to the voice storage device upon receipt of an incoming call,
wherein when the port is available between the voice storage device and the private branch exchange, the voice storage device causes paging through the private branch exchange without answering the incoming call corresponding to the incoming signal, and the private branch exchange seizes a line when the extension telephone goes off-hook, and
wherein when the port is not available, the voice storage device answers, and the private branch exchange seizes the line.

* * * * *